US006688685B2

(12) United States Patent
Kain

(10) Patent No.: US 6,688,685 B2
(45) Date of Patent: *Feb. 10, 2004

(54) JUVENILE CARRIER WITH JUVENILE-RESTRAINT HARNESS ADJUSTMENT MECHANISM

(75) Inventor: James M. Kain, Troy, OH (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/431,757

(22) Filed: May 8, 2003

(65) Prior Publication Data

US 2003/0193225 A1 Oct. 16, 2003

Related U.S. Application Data

(63) Continuation of application No. 09/877,756, filed on Jun. 8, 2001, now Pat. No. 6,626,493.
(60) Provisional application No. 60/234,528, filed on Sep. 22, 2000.

(51) Int. Cl.[7] ............................ A47C 1/08; B60R 22/10; B60N 2/26
(52) U.S. Cl. ..................................... 297/250.1; 297/484
(58) Field of Search ............................ 297/250.1, 484, 297/483, 468

(56) References Cited

U.S. PATENT DOCUMENTS

| 3,948,556 | A | 4/1976 | Hyde et al. |
|---|---|---|---|
| 4,040,664 | A | 8/1977 | Tanaka et al. |
| 4,047,755 | A | 9/1977 | McDonald et al. |
| 4,058,342 | A | 11/1977 | Ettridge |
| 4,205,877 | A | 6/1980 | Ettridge |
| 4,342,483 | A | 8/1982 | Takada |
| 4,376,551 | A | 3/1983 | Cone |
| 4,545,617 | A | 10/1985 | Drexler et al. |
| 4,632,456 | A | 12/1986 | Kassai |
| 4,709,960 | A | 12/1987 | Launes |
| 4,790,601 | A | 12/1988 | Burleigh et al. |
| 4,854,639 | A | 8/1989 | Burleigh et al. |
| 4,858,997 | A | 8/1989 | Shubin |
| 4,915,446 | A | 4/1990 | Darling et al. |
| 4,936,629 | A | 6/1990 | Young |
| 4,971,392 | A | 11/1990 | Young |
| 5,082,325 | A | 1/1992 | Sedlack |
| 5,181,761 | A | 1/1993 | Meeker |
| 5,335,964 | A | 8/1994 | Sedlack et al. |
| 5,344,213 | A | 9/1994 | Koyanagi |
| 5,468,046 | A | 11/1995 | Weber et al. |
| 5,527,094 | A | 6/1996 | Hiramatsu et al. |
| 5,580,126 | A | 12/1996 | Sedlack |
| 5,625,956 | A | 5/1997 | Cone, II et al. |
| 5,775,772 | A | 7/1998 | Lefranc |
| 6,030,047 | A | 2/2000 | Kain |
| 6,189,970 | B1 | 2/2001 | Rosko |

FOREIGN PATENT DOCUMENTS

GB  2 282 321 A  4/1995

*Primary Examiner*—Anthony D. Barfield
(74) *Attorney, Agent, or Firm*—Barnes & Thornburg

(57) ABSTRACT

A juvenile vehicle seat comprises a set shell and a juvenile restraint harness with shoulder strap portions. A harness control panel is provided on the front surface of the back of the seat shell to be adjustably movable to raise and lower the shoulder strap portions. A panel height adjustment mechanism is provided on the back of the seat shell to adjust the position of the panel. A shoulder strap tensioner is provided coupled to the height adjustment mechanism.

10 Claims, 10 Drawing Sheets

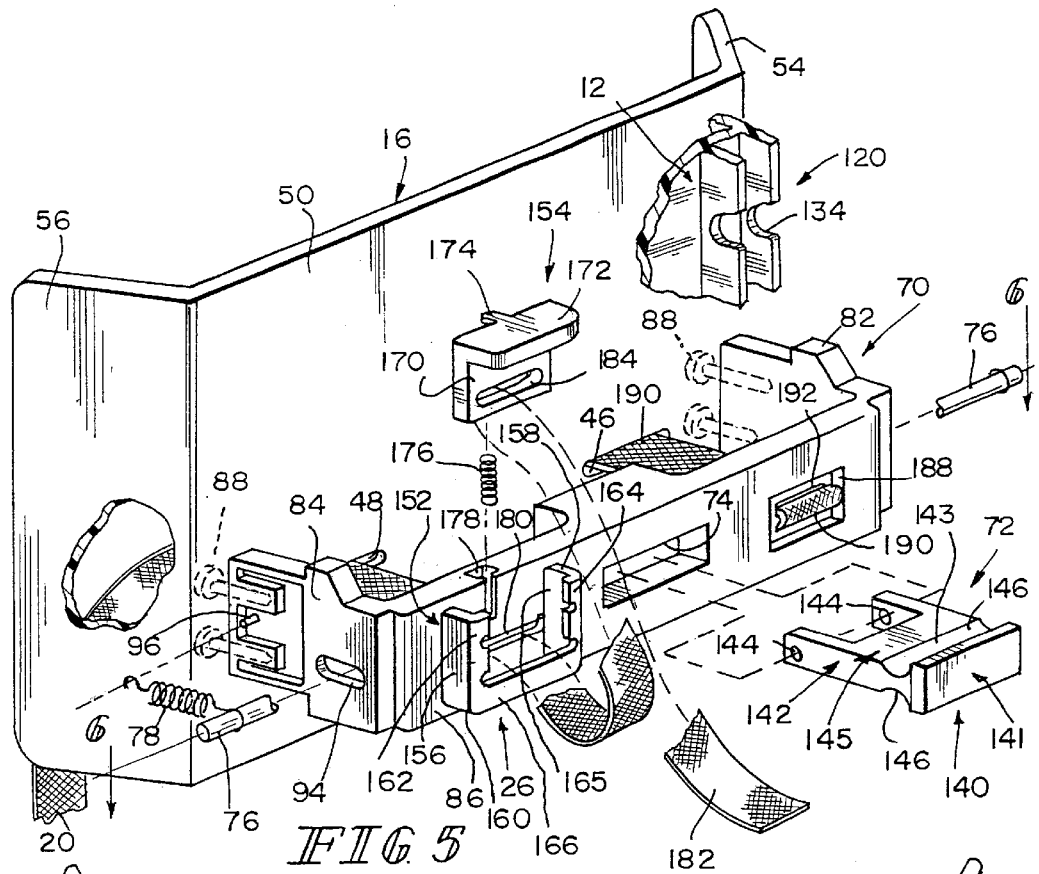
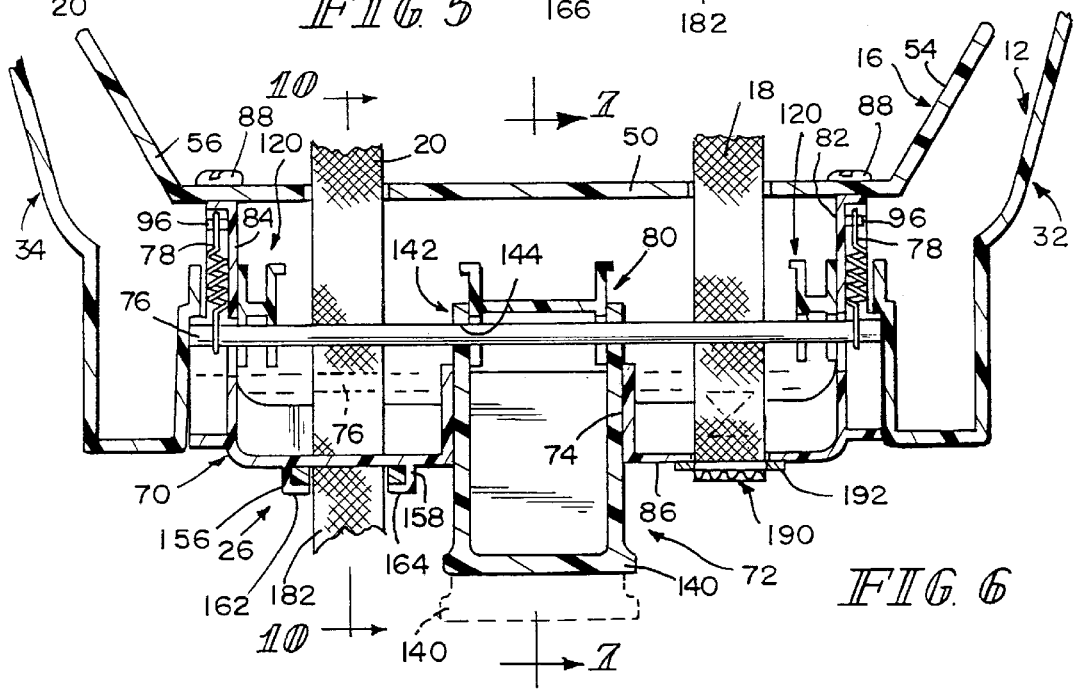

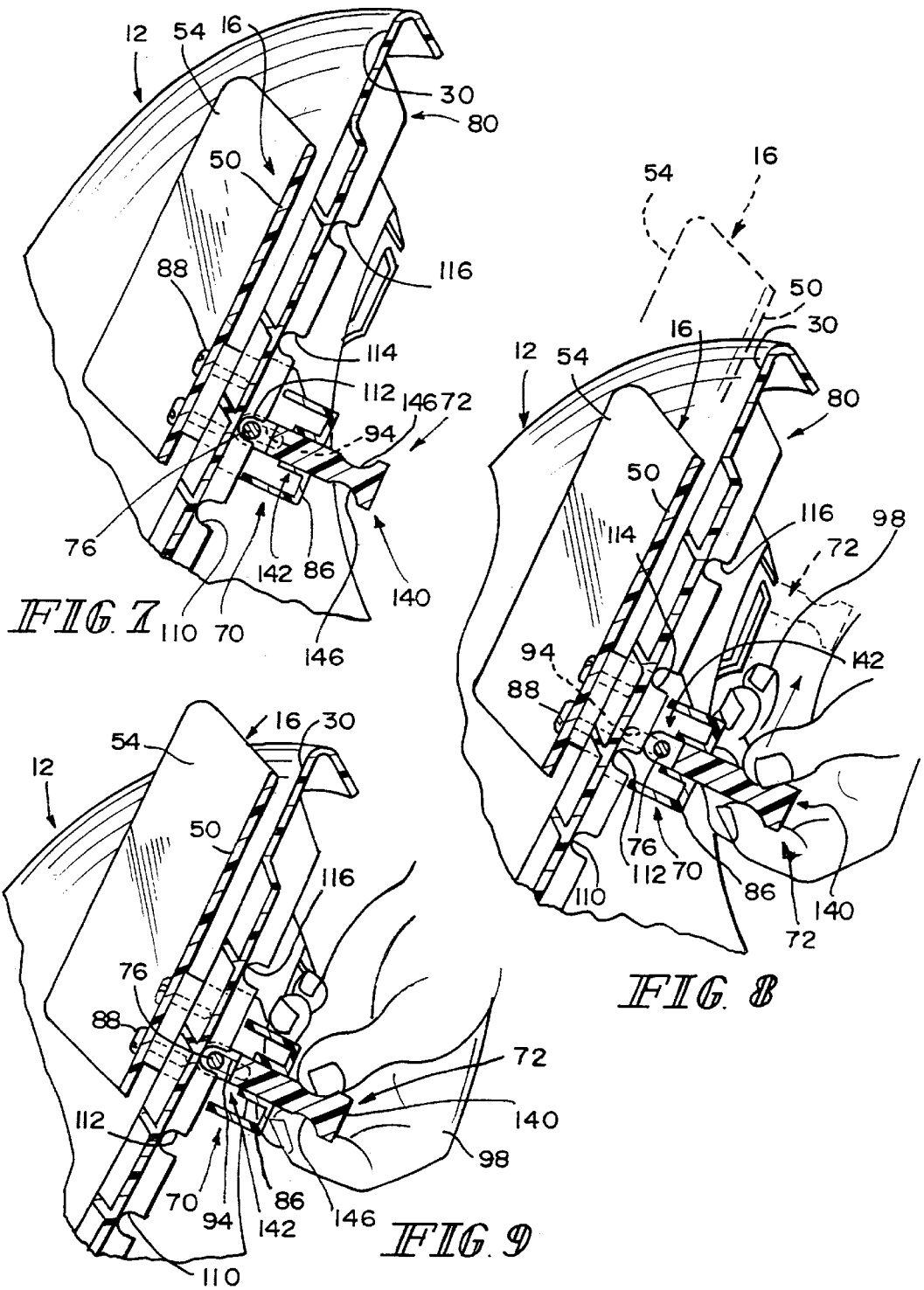

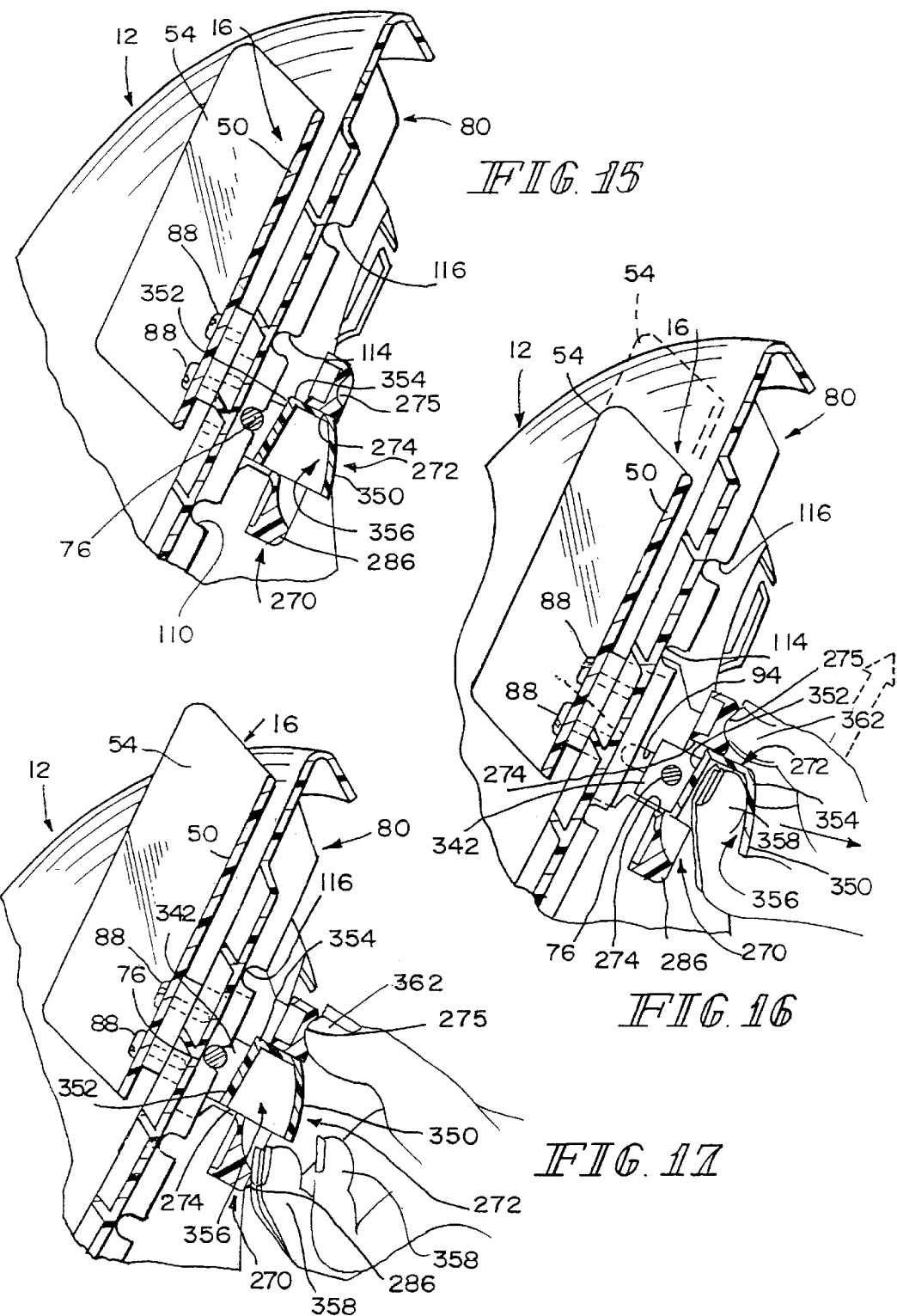

JUVENILE CARRIER WITH JUVENILE-RESTRAINT HARNESS ADJUSTMENT MECHANISM

This application continuation 35 U.S.C. 120 to U.S. application Ser. No. 09/877,756, filed Jun. 8, 2001 now U.S. Pat. No. 6,626,493 which claims priority under 35 U.S.C. 119(e) to U.S. Provisional Application Serial No. 60/234,528, filed Sep. 22, 2000, the disclosures of each of which are expressly incorporated by reference herein.

BACKGROUND AND SUMMARY OF THE INVENTION

The present invention relates to juvenile carriers or seats, and particularly to carriers having juvenile-restraining harness belts. More particularly, the present invention relates to a juvenile carrier or seat having both a juvenile-restraining harness belt and a headrest adjustment mechanism.

According to the present invention, a juvenile seat is provided which includes a seat shell and a juvenile-restraint harness coupled to the seat shell. The seat shell includes a bottom seat portion and a back support portion having a front surface and a back surface. The juvenile-restraint harness includes a shoulder strap having shoulder strap portions. The juvenile seat further includes a harness-control panel positioned adjacent the front surface of the back support portion and configured to position the shoulder strap portions. The harness-control panel is mounted on the seat shell for movement relative to the seat shell to raise and lower the shoulder strap portions with respect to the bottom seat portion.

The juvenile seat further includes a panel height adjustment mechanism coupled to the harness-control panel and positioned adjacent the back surface of the back support portion. The panel height adjustment mechanism includes a pull-handle, a belt support bar coupled to the pull-handle, and a panel height locator coupled to the seat shell. The belt support bar is provided to engage and disengage the panel height locator to secure the harness-control panel at a desired height. The pull-handle is provided to move between a lock position where the belt support bar is engaged with the panel height locator and a release position where the belt support bar is disengaged from the panel height locator.

In preferred embodiments, the juvenile seat further includes a shoulder strap tensioner coupled to the panel height adjustment mechanism and configured to cooperate with the shoulder strap of the juvenile-restraint harness to tighten and/or loosen the shoulder strap portions relative to a juvenile seated within the seat.

In further preferred embodiments, the pull-handle moves away from and toward the back surface of the back support portion. The pull-handle is normally biased in the lock position toward the back support portion of the seat shell.

Features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 5 is a rear perspective view of the harness-control panel and the handle bar of the panel-height adjust mechanism (with most of the shell broken away) showing the handle bar coupled to the harness-control panel and the pull-handle slidably received within an aperture of the handle bar and also showing a belt support bar of the panel-height adjustment mechanism slidably received within two guide channels of the handle bar and further showing a shoulder strap tensioner of the carrier coupled to the handle bar for adjusting the juvenile-restraint harness;

FIG. 6 is a sectional view taken along line 6—6 of FIG. 5 showing the handle bar coupled to the harness-control panel and also showing the belt support bar in a lock position spring-biased toward the harness-control panel and received within one of the slots of the center vertical support bar anchor member and further showing the pull-handle coupled to the spring-biased belt support bar for a user to grasp and pull the pull-handle in a direction away from the harness-control panel in order to move the belt support bar to a release position (as shown in phantom);

FIG. 7 is a sectional view taken along line 7—7 of FIG. 6 showing the belt support bar retained in the lock position within one of the slots of the center vertical support bar anchor member to retain the handle bar and harness-control panel coupled to the handle bar in a stationary position relative to the seat shell;

FIG. 8 is a sectional view similar to FIG. 7 showing a user having pulled the pull-handle in direction away from the harness-control panel to release the belt support bar from within one of the slots of the center vertical support bar anchor member so that the handle bar and harness-control panel are movable relative to the seat shell in order to adjust the height of the harness-control panel and shoulder belt portions to accommodate both small and large-sized juveniles;

FIG. 9 is a section view similar to FIGS. 7 and 8 showing the belt support bar biased by the springs to the lock position within another slot of the center vertical support bar anchor member positioned above the slot in which the belt support bar resided in FIG. 7;

FIG. 15 is a sectional view taken along line 15—15 of FIG. 14 showing the belt support bar retained in the lock position within one of the slots of the center vertical support bar anchor member to retain the handle bar and the harness-control panel coupled to the handle bar in a stationary position relative to the seat shell;

FIG. 16 is a sectional view similar to FIG. 15 showing a user having placed his/her thumb on the thumb-support of the handle bar and having placed his/her fingers within the cavity of the pull-handle and also showing the user having pulled the pull-handle in a generally horizontal direction away from the harness-control panel to release the belt support bar from within one of the slots of the center vertical bar anchor member so that the handle bar and the harness-control panel are movable generally vertically relative to the seat shell in order to adjust the height of the harness-control panel;

FIG. 17 is a sectional view similar to FIGS. 15 and 17 showing the belt support bar biased by the springs to the lock position within another slot of the center vertical support bar anchor member;

DETAILED DESCRIPTION OF THE DRAWINGS

Figure 3:
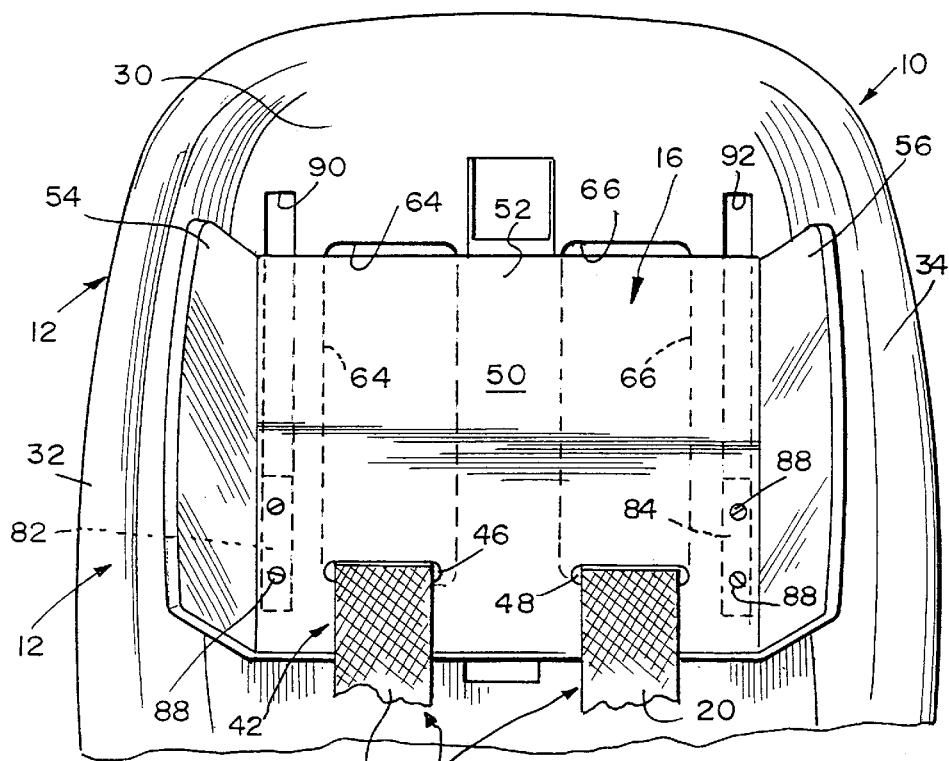
FIG. 3 is a front elevation view of an upper portion of the carrier of FIGS. 1–2 showing the harness-control panel in a lowest position relative to the seat shell.
Figure 4:
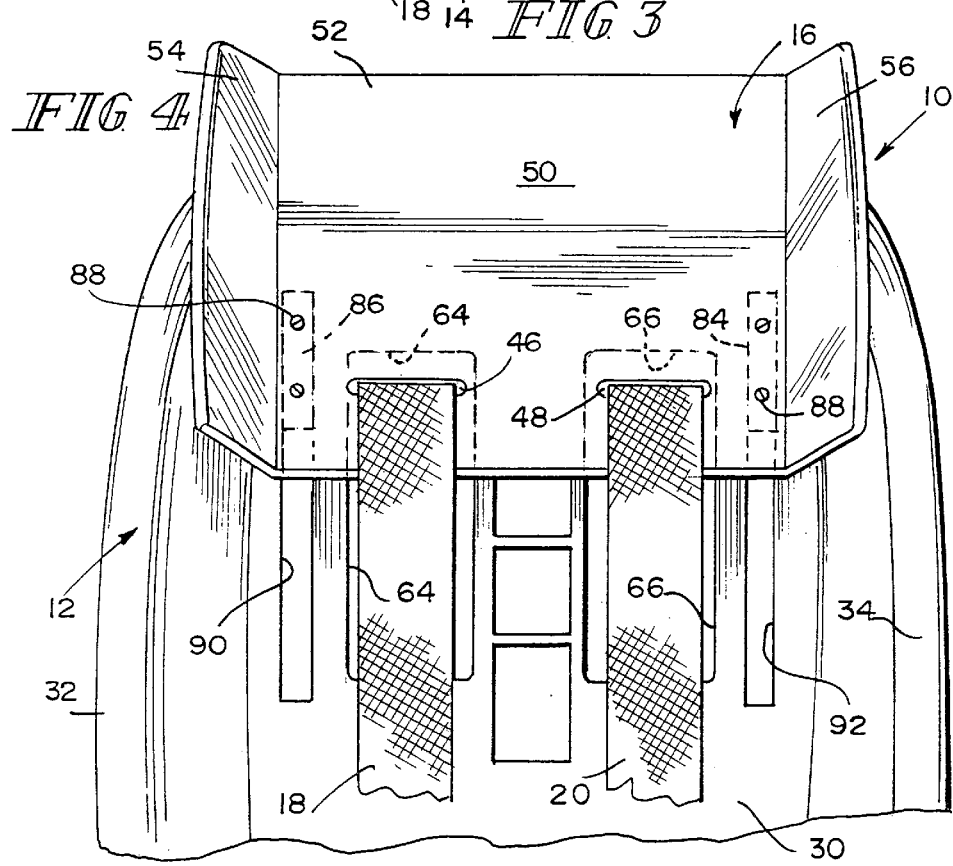
FIG. 4 is a front elevation view similar to FIG. 3 showing the harness-control panel in a highest position relative to the seat shell.

A juvenile seat or carrier 10 for receiving a juvenile (not shown) therein is provided. Carrier 10 includes a seat shell 12, a juvenile-restraint harness 14 coupled to shell 12, and a harness-control panel 16 coupled to harness 14. Harness-control panel is movable up and down relative to shell 12 in order to adjust the height of two shoulder strap portions 18, 20 of juvenile-restraint harness 14 relative to a bottom seat portion 22 of shell 12, as shown in FIGS. 3 and 4. By adjusting shoulder strap portions 18, 20, carrier 10 is able to accommodate both small and large sized juveniles.

Figure 10:
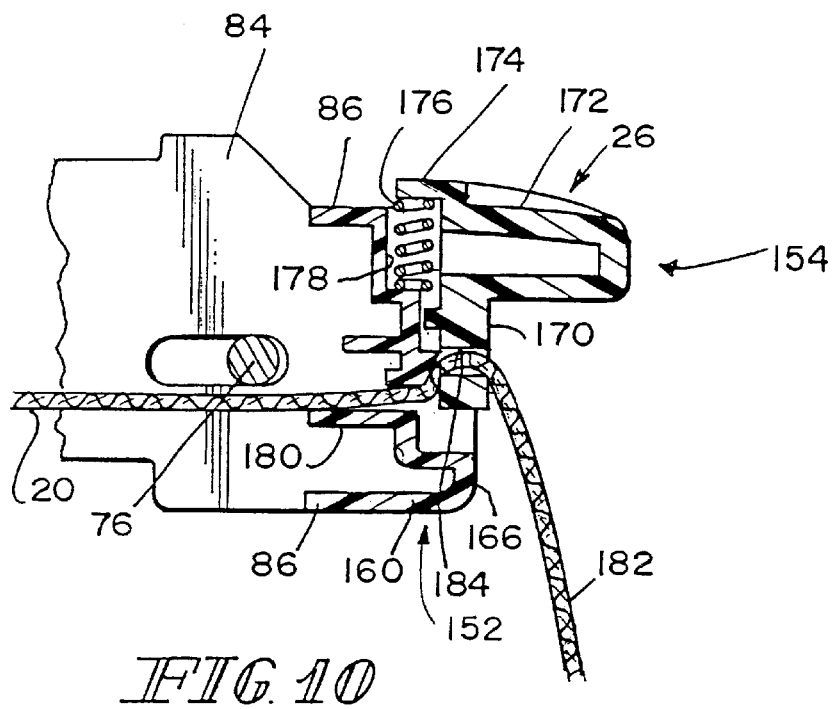
FIG. 10 is a sectional view taken along line 10—10 of FIG. 6 showing the shoulder strap tensioner of the carrier coupled to the handle bar of the panel height adjustment mechanism to allow the user to tighten or loosen the shoulder strap of the juvenile-restraint harness with respect to a juvenile seated in the carrier and further showing the tensioner including a base portion coupled to the handle bar, a movable tab portion, and a spring shown to normally bias the tensioner in a raised position, in order to render the shoulder strap immovable with respect to the handle bar.
Figure 11:
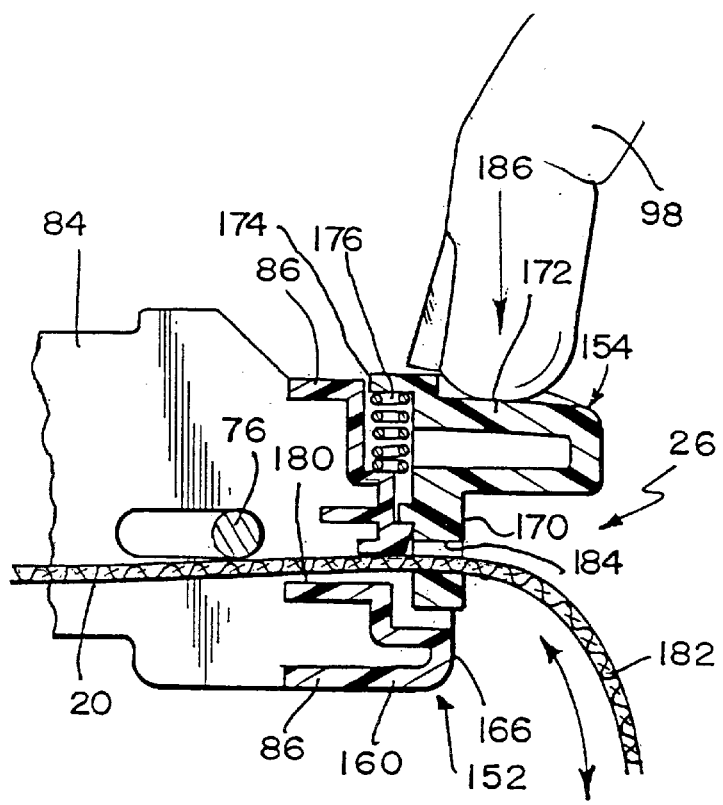
FIG. 11 is a section view similar to FIG. 10 showing the tab portion of the tensioner having been depressed by the user to move the tensioner to a lowered position so that the shoulder strap is able to move relative to the tensioner and the handle bar so that the user may tighten and/or loosen the shoulder strap to accommodate the juvenile seated in the carrier.

A panel height adjustment mechanism 24, coupled to shell 12, is manually operated by a user 98, as shown in FIGS. 8 and 9, to move harness-control panel 16 up and down relative to shell 12, as shown for example, in FIGS. 7–9. A shoulder strap tensioner 26 is coupled to a portion of panel height adjustment mechanism 24 and is provided for adjusting the tension of shoulder strap portions 18, 20 for a juvenile seated in carrier 10, as shown in FIGS. 10 and 11.

Figure 1:
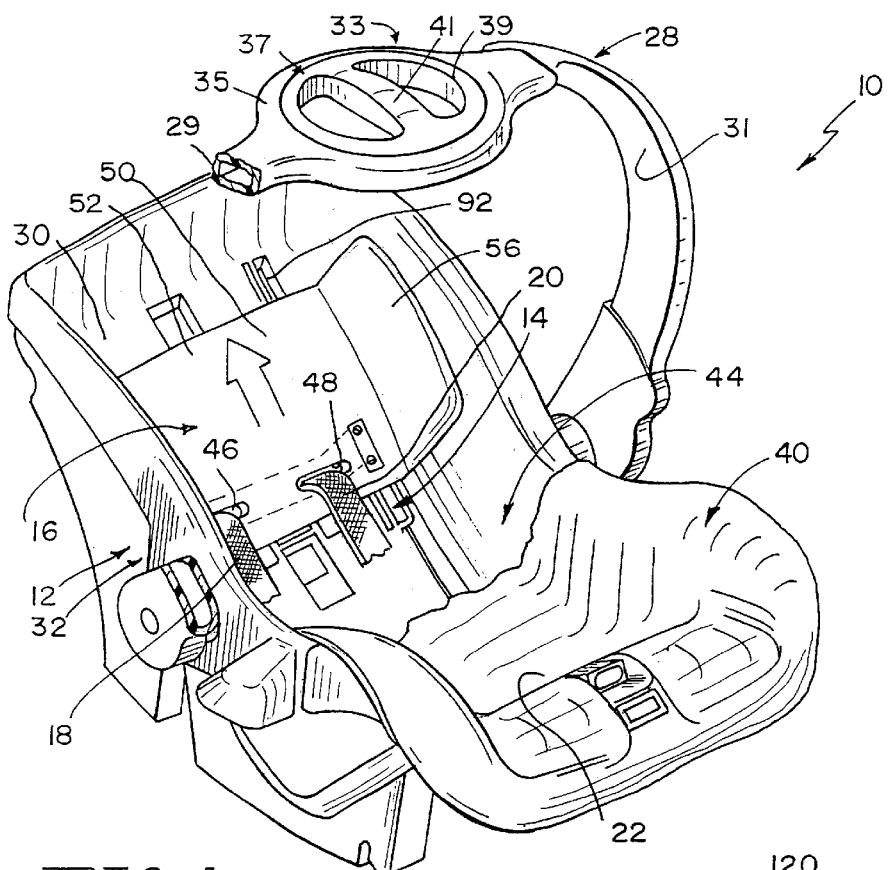
FIG. 1 is a front perspective view of a juvenile seat or carrier showing the carrier including a seat shell, a juvenile-restraint harness coupled to the shell, and a harness-control panel movable upwardly and downwardly relative to the shell to adjust the height of two shoulder strap portions of the juvenile-restraint harness relative to a bottom seat portion of the shell in order to adapt the carrier for use by both small-sized and large-sized juveniles.
Figure 2:
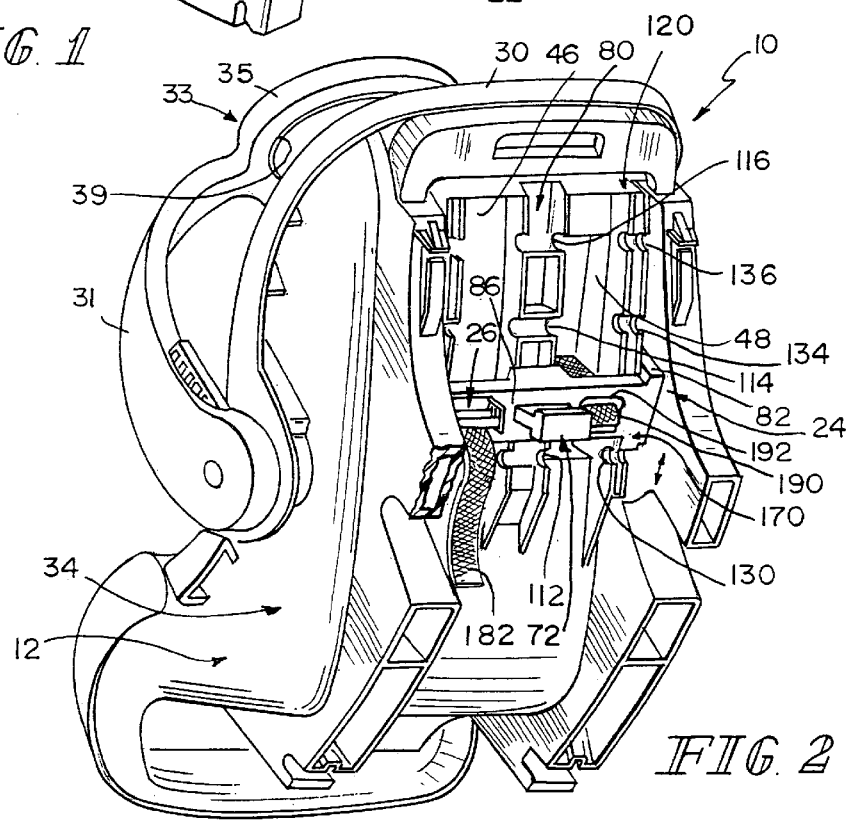
FIG. 2 is a rear perspective view of the carrier of FIG. 1 showing the two shoulder strap portions of the juvenile-restraint harness positioned to extend through two vertical channels formed in the seat shell in order to engage a panel-height adjustment mechanism of the carrier, which mechanism includes a handle bar, a pull-handle, and a slotted center vertical support bar anchor member coupled to a back side of the shell.

As mentioned above, shell 12 includes bottom seat portion 22 adapted to support a juvenile's bottom and upper legs and a back support portion 30 positioned to lie at an angle to bottom seat portion 22, as shown in FIG. 1. First and second side wall portions 32, 34 are provided in shell 12 for preventing lateral movement of the juvenile seated in carrier 10 and lie on opposite sides of bottom seat portion 22. A cushion or carrier cover 40 is provided for covering the bottom seat portion 22 and/or back support portion 30 for added comfort and/or appearance.

Carrier 10 further includes a carry-arm 28 coupled to first and second side wall portions 32, 34. Carry-arm 28 is provided to allow a user to hold or grasp carrier 10 in order to tote or transport carrier 10 from one place to another. Carry-arm 28 includes first and second arm portions 29, 31 each coupled to respective first and second side wall portion 32, 34, and a carry-handle 33 coupled to and positioned to lie between each of the first and second arm portions 29, 31. Carry-handle 33 includes an outer circular portion 35 rigidly coupled to and integral with first and second arm portions 29, 31 and an inner member 37 including a rotatable portion 39 coupled to outer circular portion 35 and a handle portion 41 rigidly coupled to rotatable portion 39. Inner member 37 is normally in a position to rotate relative to outer circular portion 35 in order to position inner member 37 in a position most comfortable to the user. Once handle portion 41 of inner member 37 is grasped by the user and pulled upwardly in order to lift carrier 10, inner member 37 moves to a locked position relative to outer circular portion 35.

A shoulder strap 42, of juvenile-restraint harness 14 including shoulder strap portions 18, 20, is provided to restrain a juvenile's movement relative to shell 12. Juvenile-restraint harness 14 further includes a buckle unit (not shown) coupled to shoulder strap portions 18, 20 and connectable to bottom seat portion 22 of shell 12 to keep juvenile restrained within shell 12. As shown in FIG. 1, shoulder strap portions 18, 20 are received through shoulder belt receiving slots 46, 48 of harness-control panel 16.

Harness-control panel 16 is positioned in a juvenile-receiving space 44 defined in a front portion of a carrier 10 and is mounted for up and down movement relative to bottom seat portion 22, as shown in FIGS. 3 and 4. Up and down movement of harness-control panel 16 functions to raise and lower the height of shoulder strap portions 18, 20 above bottom seat portion 22 to adapt carrier 10 to accommodate small and large sized juveniles.

Harness-control panel 16 includes a back plate 50 formed to include slots 46, 48 and a headrest 52 provided in an upper portion of back plate 50 above slots 46, 48. Harness-control panel 16 also includes first and second wing members 54, 56 coupled to opposite edges of back plate 50 and positioned to lie in spaced-apart relation to one another. Each wing member 54, 56 is oriented to lie at an angle relative to back plate 50, as shown in FIGS. 1, 3, 4, and 6. In addition to raising and lowering shoulder strap portions 18, 20, the up and down movement of harness-control panel 16 also functions to raise and lower headrest 52 above bottom seat portion 22 to adapt carrier 10 to accommodate small and large sized juveniles. As shown, for example, in FIGS. 3 and 4, shoulder strap portions 18, 20 and headrest 52 move up and down together relative to shell 12 to assure proper shoulder strap fit for a juvenile seated in carrier 10. A caregiver can raise and lower harness-control panel 16 to change the height of shoulder strap portions 18, 20 by operating panel height adjustment mechanism 24. Panel height adjustment mechanism 24 is coupled to harness-control panel 16 and will be described later in more detail.

Back support portion 30 of shell 12 is formed to include two vertical channels 64, 66 shown, for example, in FIGS. 3 and 4. Channels 64, 66 are aligned in spaced-apart relation to lie "behind" back plate 50 of harness-control panel 16 so that shoulder strap portions 18, 20 can pass through first and second channels 64, 66. As mentioned before, harness-control panel 16 is formed to include a pair of spaced-apart horizontally extending shoulder belt receiving slots 46, 48. Slots 46, 48 are in aligned communication with respective channels 64, 66 of back support portion 30 to enable movement of shoulder strap portions 18, 20 within respective slots 46, 48 and respective channels 64, 66 during up and down movement of harness-control panel 16 relative to shell 12. Harness-control panel 16 is movable between a lowest position, shown in FIG. 3, and a highest position, as shown in FIG. 4.

Panel height adjustment mechanism 24 of carrier 10, shown, for example, in FIGS. 2 and 5–9, operates to control the height of harness-control panel 16 relative to bottom seat portion 22 of shell 12. Panel height adjustment mechanism 24 includes a handle bar 70 coupled to harness-control panel 16 and a pull-handle 72 slidably received within an aperture 74 of handle bar 70. Panel height adjustment mechanism 24 further includes a belt support bar 76 movably coupled to handle bar 70 and a pair of tension springs 78 each coupled at one end to handle bar 70 and at another end to belt support bar 76, as shown in FIGS. 5 and 6. Panel height adjustment mechanism 24 further includes a center vertical bar anchor member 80 coupled to a rear side of back support portion 30 of shell 12. Belt support bar 76 is provided to engage and disengage center vertical bar anchor member 80 to secure harness-control panel 16 at a desired height above bottom seat portion 22. As best seen in FIG. 5 belt support bar 76 supports handle bar 70 and thus provides indirect support of the straps which are supported by handle bar 70.

Handle bar 70 includes a first arm 82, a second arm 84 spaced-apart from first arm 82, and horizontal member 86 coupled to and positioned to extend between first arm 82 and second arm 84. Each arm 82, 84 is coupled to harness-control panel 16 by screws 88, as shown in phantom in FIG. 5. Aperture 74 of handle bar 70 is formed in horizontal member 86 between first and second arms 82, 84. As shown in FIGS. 3 and 4, first arm 82 of handle bar 70 passes through a first vertical guide slot 90 formed in back support portion 30 of shell 12 and second arm 84 passes through a second vertical guide slot 92 also formed in back support portion 30 of shell. Guide slots 90, 92 are positioned to lie in spaced-apart parallel relation to one another. First arm 82, coupled to harness-control panel 16, reciprocates in first guide slot 90 and second arm 84, coupled to harness-control panel 16, reciprocates in second guide slot 92 as harness-control panel 16 moves up and down relative to back support portion 30 between the lowest position (shown, for example, in FIG. 3) adapted to suit a small-sized juvenile and the highest position (shown, for example, in FIG. 4) adapted to suit a larger-sized juvenile.

Each of first and second arms 82, 84 of handle bar 70 is formed to define a guide channel 94, shown best in FIG. 5, for receiving belt support bar 76 therethrough. Each end of belt support bar 76 is received through one of the guide channels 94 so that belt support bar 76 is coupled to and positioned to extend between first and second arms 82, 84 of handle bar 70. Further, belt support bar 76 is slidably movable within guide channels 94 relative to handle bar 70 in a generally horizontal direction. Each of the first and second arms 82, 84 further includes a spring mount 96 for receiving one end of one of the tension springs 78. Each tension spring 78 is coupled to and positioned to extend between respective spring mount 96 and belt support bar 76. Tension springs 78 function to normally bias belt support bar 76 in a lock position in engagement with center vertical bar anchor member 80, as shown in FIG. 7. Although springs 78 are tension springs, one could use compression springs located between belt support bar 76 and horizontal member 86 of handle bar 70.

As shown in FIGS. 2 and 7–9, center vertical bar anchor member 80 is coupled to the rear side of back support portion 30 of shell 12. Center vertical bar anchor member 80 is positioned to lie midway between each side wall portion 32, 34 of shell 12. Center vertical bar anchor member 80 is formed to include a plurality of panel height locators such as vertically spaced-apart slots (e.g. slots 110, 112, 114, and 116) for receiving belt support bar 76 therein to establish a fixed position of first and second arms 82, 84 of handle bar 70 (and harness-control panel 16 coupled to arms 82, 84) relative to the underlying bottom seat portion 22 of shell 12. Belt support bar 76 is received within one of the slots 110, 112, 114, or 116 when in the lock position. As shown in FIGS. 7–9, slot 110 is located to define the "lowest" position of harness-control panel 16, slot 112 is located to define a "middle" position of harness-control panel 16, slot 114 is located to define a "high" position of harness-control panel 16, and slot 116 is located to define the "highest" position of harness-control panel. As shown in FIG. 3, harness-control panel 16 is in the lowest position wherein belt support bar 76 is received within slot 110 whereas FIG. 4 shows harness-control panel 16 in the highest position wherein belt support bar 76 is received within slot 116. As shown in FIG. 7, harness-control panel 16 is in the middle position and belt support bar 76 is received within slot 114. As shown in FIG. 9, harness-control panel 16 is in the high position relative to bottom seat portion 22 of shell 12 and belt support bar 76 is received within slot 114. Although slots 110, 112, 114 and 116 are provided, it is within the scope of this disclosure to provide any number of slots for receiving belt support bar 76.

In addition to center vertical bar anchor member 80, panel height adjustment mechanism 24 further includes a pair of outer vertical bar anchor members 120 coupled to the rear side of back support portion 30 of shell 12 to lie in spaced-apart relation to each other. Center vertical bar anchor member 80 is positioned to lie between the outer vertical bar anchor members 120. Similar to center vertical bar anchor member 80, each vertical bar anchor member 120 includes a plurality of panel height locators such as vertically spaced-apart slots (e.g. slots 130, 132, 134, and 136) for receiving belt support bar 76 therein. Vertically spaced-apart slots 130, 132, 134, and 136 of each outer vertical bar anchor member 120 correspond to the vertically spaced-apart slots 110, 112, 114, and 116 of center vertical bar anchor member 80.

As mentioned above, panel height adjustment mechanism 24 includes pull-handle 72 which is slidably received within aperture 74 formed in horizontal member 86 of handle bar 70. Pull-handle 72 includes a grip portion 140 and a bar-mount portion 142 coupled to grip portion 140, as shown in FIGS. 5 and 6. Pull-handle 72 can also be defined as including a head portion 141, a neck portion 143, and a body portion 145. Body portion 145 of pull-handle 72 is defined by a generally horizontal member having a rectangular cross-section. Belt support bar 76 is received within an aperture 144 formed in body portion 145 or bar-mount portion 142 to fixedly couple belt support bar 76 to pull-handle 72. Grip portion 140 is defined by head portion 141 and grooves 146 of neck portion 143. Neck portion 143 is provided for a user to grasp during use, as shown in FIGS. 8 and 9. A cross-section of the neck portion 143 forms a hyperboloid.

Pull-handle 72 moves in a generally horizontal direction away from and toward back support portion 30 of shell 12 through aperture 74 of handle bar 70 in order to move belt support bar 76 from the normally lock position in engagement with one of the slots of center vertical bar anchor member 80 to a release position where the belt support bar 76 is spaced-apart from center vertical bar anchor member 80. Guide channels 94 of each arm 82, 84 of handle bar 70 allow belt support bar 76 to move between the lock and release positions relative to handle bar 70. Tension springs 78 are arranged to cause belt support bar 76 to be retained in one of the slots 110, 112, 114, or 116 formed in center vertical bar anchor member 80 upon movement of belt support bar 76 into such a slot. As mentioned before, guide channels 94 support belt support bar 76 for back-and-forth sliding movement as belt support bar 76 is moved into and out of any of the slots 110, 112, 114, or 116 of center vertical bar anchor member by pull-handle 72. When in the release position, where belt support bar 76 is disengaged from center and outer vertical bar anchor members 80, 120, pull-handle 72, handle bar 70, belt support bar 76, and harness-control panel 16 coupled to handle bar 70, are all movable up and down in a generally vertical direction relative to bottom seat portion 22 of shell 12.

Because handle bar 70 is rigidly coupled to harness-control panel 16, handle bar 70 is urged to move generally vertically with harness-control panel 16 relative to shell 12 when pull-handle 72 and belt support bar 76 are in the release position. Pull-handle 72 is in the release position when a user has moved pull-handle 72 in a direction away from back support portion 30 of shell 12 against the bias of springs 78 in order to disengage belt support bar 76 from center vertical bar anchor member 80. In operation, pull-handle 72 is provided for user 98 to grasp as shown in FIGS. 8 and 9 wherein a user's fingers and thumb engage the neck portion 143 of pull-handle 72. A shown in FIG. 7, pull-handle 72 is in the lock position where belt support bar 76 is engaged with center vertical bar anchor member 80 and received within slot 112 of center vertical bar anchor member 80. As shown in FIG. 8, user 98 grasps grip portion 140 of pull-handle 72 and urges pull-handle 72 (and belt support bar 76 coupled to pull-handle 72) against the bias of springs 78 to move in a generally horizontal direction away from back support portion 30 of shell 12 to the release position. Once in the release position, as shown in FIG. 8, user 98 may move pull-handle 72 in a generally vertical direction up and down to move belt support bar 76 and handle bar 70 up and down in order to adjust the height of harness-control panel 16 (coupled to handle bar 70) relative to bottom seat portion 22 of shell 12. Once harness-control panel 16 is moved to the desired position, user 98 releases pull-handle 72 to allow springs 78 to bias belt support bar 76 to the lock position within one of the slots 110, 112, 114, or 116 of center vertical bar anchor member 80.

Once belt support bar 76 is released from engagement within one of the slots 110, 112, 114, or 116, panel height adjustment mechanism 24 with harness-control panel 16 is movable up or down to engage any one of the other slots 110, 112, 114, or 116 formed in vertical center bar anchor member 80. As shown in FIG. 6, shoulder strap portions 18, 20 are positioned to lie above belt support bar 76 and on opposite sides of center vertical bar anchor member 80 so that any raising or lowering of belt support bar 76 relative to center and outer vertical bar anchor members 80, 120 will change the height of the first and second shoulder strap portions 18, 20 of shoulder strap 42 relative to bottom seat portion 22. FIGS. 7–9, for example, illustrate the movement of panel-height adjustment mechanism 24 from the middle position in where belt support bar 76 is received within slot 112 to the high position where belt support bar 76 is received within slot 114.

In addition to providing the function of raising and lowering the harness-control panel 16 and shoulder strap portions 18, 20, juvenile carrier 10 further provides the function of adjusting the shoulder strap 42 and shoulder strap portions 18, 20 by providing shoulder strap tensioner 26 coupled to a portion of the panel height adjustment mechanism 24. Specifically, tensioner 26 is coupled to horizontal member 86 of handle bar 70, as shown in FIGS. 5, 10, and 11 and is provided to allow user 98 to tighten and/or loosen shoulder strap portions 18,20 to fit a juvenile seated in carrier 10. Tensioner 26 includes a base portion 152 coupled to handle bar 70 and a tab portion 154 slidably received within base portion 152. As shown in FIG. 5, base portion 152 is generally "U-shaped" and includes two side walls 156, 158 spaced-apart from each other and a bottom wall 160 coupled to and positioned to lie between side walls 156, 158. Bottom wall 160 and side walls 156, 158 are all coupled to horizontal member 86 of handle bar 70. Two front side walls 162, 164 are coupled to side walls 156, 158, respectively, and a front bottom wall 166 is coupled to bottom wall 166 and front side walls 162, 164. Side walls 156, 158, bottom wall 160, front side walls 162, 164, and front bottom wall 166 all cooperate to form a channel 168 for receiving tab portion 154 of tensioner 26 therein.

Tab portion 154 of tensioner 26 includes a channel-fitting portion 170 and a lip portion 172 coupled to channel-fitting portion 170. Channel-fitting portion 170 is slidably received within channel 168 of base portion 152. A flange 174 is coupled to channel-fitting portion 170, as shown in FIGS. 5, 10, and 11. Flange 174 is provided for engaging a compression spring 176 of tensioner 26 positioned to lie within a groove 178 (as shown in FIG. 5) of horizontal member 86 of handle 70. Groove 178 (receiving spring 176 therein) is in alignment with flange 174 so that tab portion 154 of tensioner 26 is normally biased to a raised position, as shown, for example, in FIG. 10.

Shoulder strap 42 of carrier 10 is positioned to be received through tensioner 26 in order to allow shoulder strap 42, including shoulder strap portions 18, 20, to be tightened or loosened in order to properly adjust the tension of strap 42 to best fit the particular juvenile seated in carrier 10. As shown in FIG. 5, horizontal member 86 of handle bar 70 includes a slot 180 positioned to lie between side walls 156, 158 of base portion 152 of tensioner 26. Slot 180 is provided to receive an adjusting-end portion 182 of shoulder strap 42 therethrough, as shown in FIGS. 5, 10, and 11. Further, channel-fitting portion 170 of tab portion 154 of tensioner 26 includes a slot 184 also for receiving adjusting-end portion 182 of shoulder strap 42 therethrough. The manner in which adjusting-end portion 182 of shoulder strap 42 is woven through slot 180 of handle bar 70 and slot 184 of tab portion 154 is illustrated in FIG. 5.

When tab portion 154 is in the normally raised portion, slot 184 of channel-fitting portion 170 is positioned to lie above slot 180 of handle bar 70, as shown in FIG. 10. When slot 184 is positioned to lie above slot 180, adjusting-end portion 182 of shoulder strap 42 is prevented from moving generally horizontally through slots 180, 184 relative to tensioner 26. However, when tab portion 154 is depressed by a user 98 in a downward direction 186 against the bias of spring 176, as shown in FIG. 11, slot 184 of channel-fitting portion 170 aligns with slot 180 of handle bar 70. When slots 180, 184 are aligned with each other, tab portion 154 of tensioner 26 is in the lowered position and adjusting-end portion 182 of shoulder strap 42 is able to freely move in a generally horizontal direction through slots 180, 184 relative to tensioner 26 in order to adjust the tension of shoulder strap 42, and therefore shoulder strap portions 18, 20, to fit a juvenile seated in carrier 10.

As shown in FIG. 5, base portion 152 of tensioner 26 is located on the left side of aperture 74 which receives the pull-handle 72 therethrough. However, it is within the scope of this disclosure to position the tensioner 26 in any other place on carrier 10. To the right of aperture 74 of handle bar 70 is another aperture 188 formed in horizontal member 86. An anchor end 190 of shoulder strap 42 is received through aperture 188 and is held stationary relative to handle bar 70 through the use of an anchor clip 192 coupled to anchor end 190 of shoulder strap 42. Anchor clip 192 is recessed within aperture 188 of horizontal member 86 in order to retain anchor end 190 of shoulder strap 42 stationary relative to handle bar 70.

Figure 12:
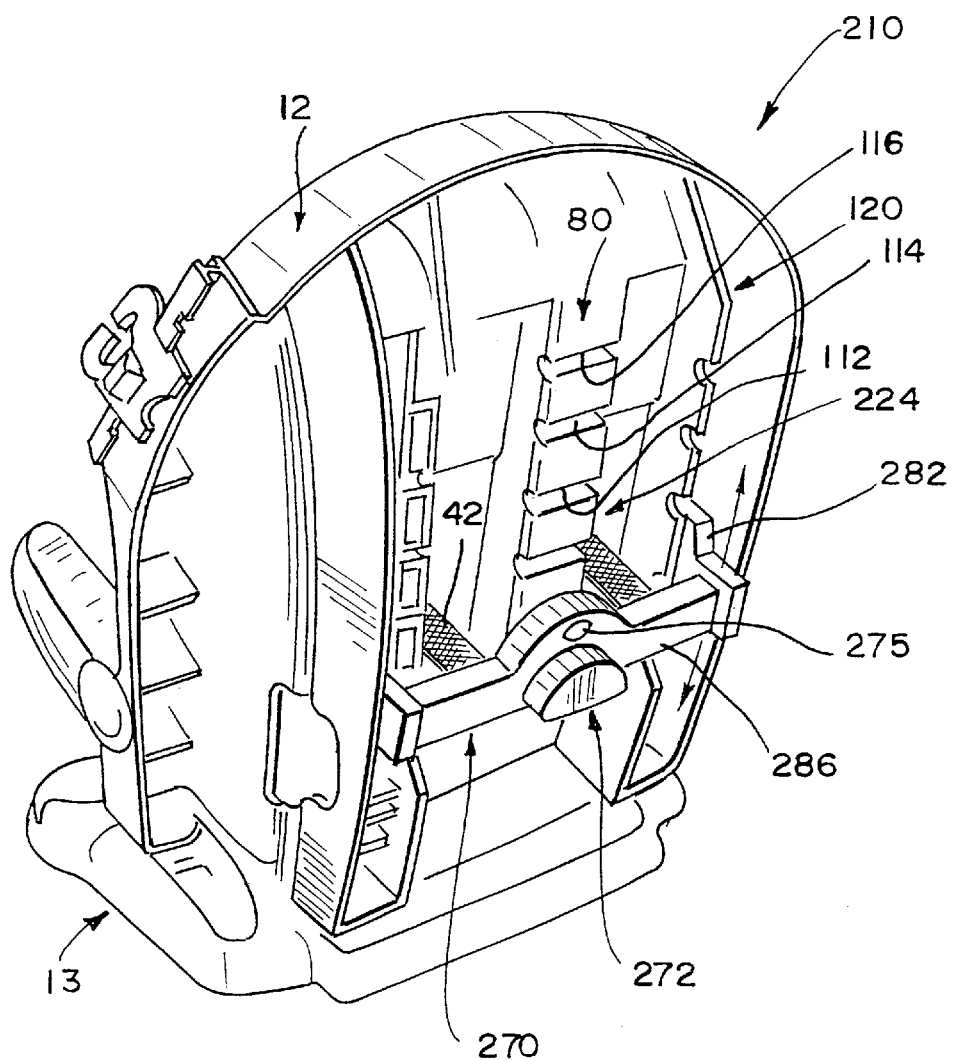
FIG. 12 is a rear perspective view of an alternative juvenile seat carrier of the present invention including an alternative panel-height adjustment mechanism having a handle bar, a pull-handle formed to define a cavity (shown in FIGS. 15–17) for receiving a user's hand therein, a thumb-support of the handle bar, and a slotted center vertical support bar anchor member coupled to the back side of the carrier.
Figure 13:
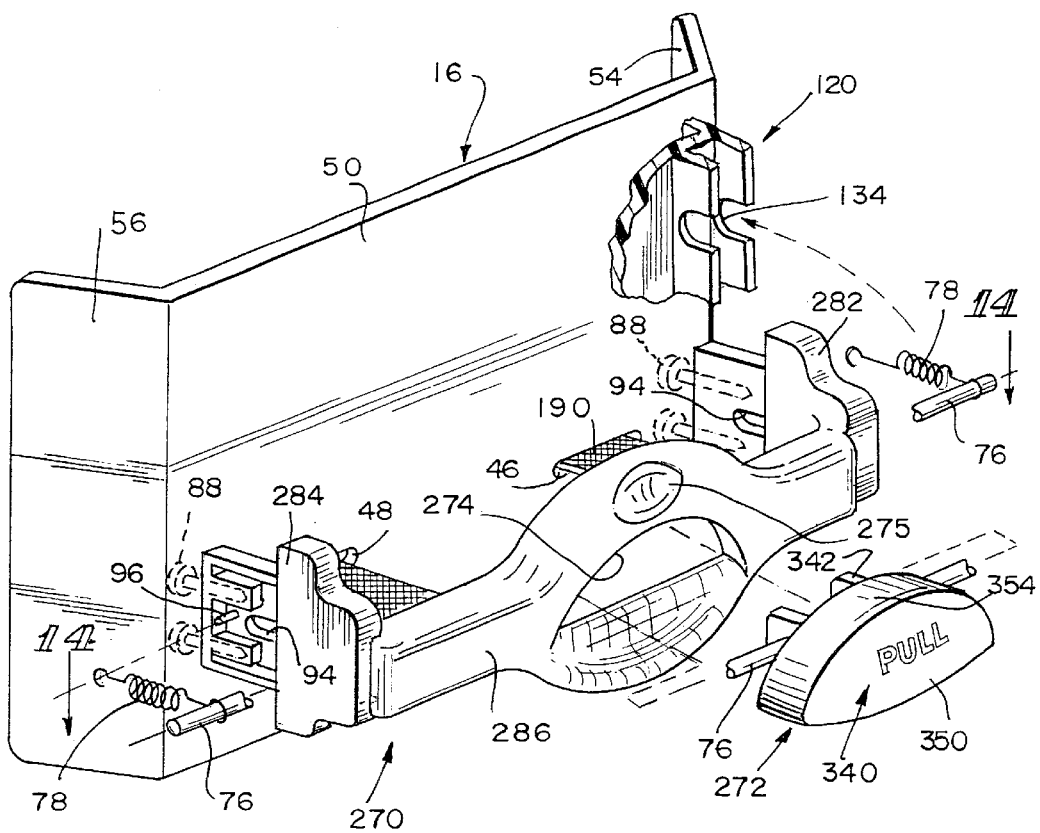
FIG. 13 is a rear perspective view of the harness-control panel of the carrier of FIG. 12 and the alternative handle bar of the alternative panel-height adjustment mechanism (shown with most of the seat shell broken away) showing the handle bar coupled to the harness control panel and the pull-handle slidably received within an aperture of the handle bar, the thumb-support being positioned above the aperture of the handle bar, and also showing the belt support bar of the panel-height adjustment mechanism slidably received within two guide channels of the handle bar.
Figure 14:
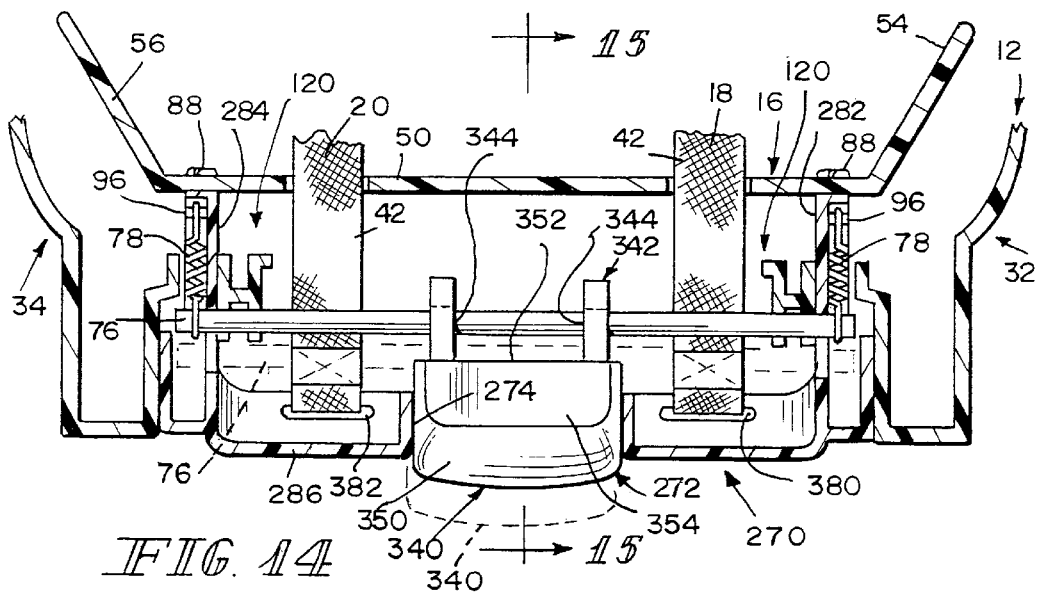
FIG. 14 is a sectional view taken along line 14—14 of FIG. 13 showing the handle bar coupled to the harness-control panel and the belt support bar in a lock position spring-biased toward the harness-control panel and received within one of the slots of the center vertical support bar anchor member of the panel-height adjustment mechanism, and also showing the pull-handle coupled to the spring-biased belt support bar and being provided for a user to grasp and pull in a direction away from the harness-control panel in order to move the belt support bar to a release position (as shown in phantom)

An alternative juvenile seat or carrier 210 is provided and shown in FIGS. 12–17. As shown in FIG. 12, carrier 210 includes a seat shell 12 and a base 13 to which seat shell 12 is coupled. Carrier 210 also includes an alternative panel-height adjustment mechanism 224 which serves the same function as mechanism 24, described above, by operating to control the height of harness-control panel 16 relative to bottom seat portion 22 of shell 12. Mechanism 224 includes an alternative handle bar 270 coupled to harness-control panel 16 and an alternative pull-handle 272 slidably received within an aperture 274 of handle bar 270. Similar to mechanism 24, alternative panel-height adjustment mechanism 224 further includes belt support bar 76 movably coupled to handle bar 270 and a pair of tension springs 78 each coupled at one end to handle bar 270 and at another end to belt support bar 76, as shown in FIGS. 13 and 14. Alternative mechanism 224, also similar to mechanism 24 described above, further includes center vertical bar anchor member 80 and outer vertical bar anchor members 120 coupled to the rear side of back support portion 30 of shell 12. Belt support bar 76 is provided to engage and disengage center vertical bar anchor member 80 to secure harness-control panel 16 at a desired height above bottom seat portion 22.

Similar to handle bar 70, alternative handle bar 270 includes a first arm 282, a second arm 284 spaced-apart from first arm 282, and a horizontal member 286 coupled to and positioned to extend between first arm 282 and second arm 284. Aperture 274 of handle 270 is formed in horizontal member 286 between first and second arms 282, 284. Horizontal member 286 further includes a thumb-support 275 above aperture 274, as shown in FIG. 13. As shown in FIG. 14, horizontal member 286 of handle bar 170 includes a first slot 380 and a second slot 382 spaced apart from the first slot 380. Each of the first and second slots 380, 382 are positioned between first arm 282 and second arm 284 of handle bar 270. First and second slots 380, 382 are each provided to receive a portion of shoulder strap 42 therethrough. Further, although not shown in FIGS. 12–17, it is within the scope of the disclosure for alternative carrier 110 to include tensioner 26, as described above, coupled to handle bar 170 in order to adjust the tension of shoulder strap 42 to fit the child seated in carrier 110. It is further within the scope of this disclosure for alternative handle bar 170 to include aperture 188 for receiving anchor end 190 of shoulder strap 42, as described above.

Each arm 282, 284 of alternative handle bar 270 is coupled to harness-control panel 16 by screws 88, as shown in FIG. 14 and in phantom in FIGS. 13 and 15–17. Each first and second arm 282, 284 passes through first and second vertical guide slots 90, 92, respectively for up and down reciprocation relative to back support portion 30 between the lowest harness-control 16 position and the highest harness-control 16 position.

Further, each of the first and second arms 282, 284 is formed to define guide channel 94, shown best in FIG. 13, for receiving belt support bar 76 therethrough. Each end of belt support bar 76 is received through one of the guide channels 94 so that belt support bar 76 is coupled to and positioned to extend between first and second arms 282, 284 of handle bar 270 movable within guide channels 94 relative to handle bar 270. Each of first and second arms 282, 284 further includes spring mount 96 for receiving one end of one of the tension springs 78. Each tension spring 78 is coupled to and positioned to extend between respective spring mount 96 and belt support bar 76, as shown in FIGS. 13 and 14. Tension springs 78 function to normally bias belt support bar 76 in the lock position in engagement with center vertical bar anchor member 80 and outer vertical bar anchor members 120. As stated before with respect to mechanism 24, it is also within the scope of this disclosure to include compression springs, rather than tension springs 78, located between belt support bar 76 and horizontal member 286 of alternative handle bar 270, for example.

As mentioned above, alternative mechanism 224 includes pull-handle 272 which is slidably received within aperture 274 formed in horizontal member 286 of handle bar 270. Pull-handle 272 includes an alternative grip portion 340 and an alternative bar-mount portion 342 coupled to grip portion 340, as shown in FIGS. 13 and 14. Belt support bar 76 is received within apertures 344 formed in bar-mount portion 342 to couple belt support bar 76 to pull-handle 272.

Grip portion 340 includes a front wall 350, shown in FIG. 13 with the word "PULL", a rear wall 352 spaced-apart from front wall 350, and a middle wall 354 coupled to and positioned between both front and rear walls 350, 352. Front wall 350 and rear wall 352 are generally semi-circular in shape, as shown by FIGS. 12 and 13, and middle wall 354 is curved and generally "c-shaped". Front wall 350, rear wall 352, and middle wall 354 cooperate to define a grip-cavity or finger-receiving receptacle 356 for receiving the fingers 358 of a user's hand 360 therein, as shown in FIG. 16, for example. Thumb-support 275 of horizontal member 286 of handle bar 270 is provided to support a user's thumb 362 so that the user is more easily able to pull the pull-handle 272 in a direction away from the back support portion 30 of seat shell 12 in order to release belt support bar 76 from locked engagement with center vertical bar anchor member 80, as shown in FIGS. 15–17.

Similar to mechanism 24 of carrier 10, alternative pull-handle 272 of mechanism 224 moves between the lock position and the release position. In the lock position, belt support bar 76 is engaged with any one of the slots of the center vertical bar anchor member 80. In the release position, belt support bar 76 is spaced-apart from center vertical bar anchor member 80. When pull-handle 272 is in the release position, harness-control panel 16, handle bar 170, pull-handle 272, and bar support member 76 are movable generally vertically relative to bottom seat portion 22.

Figure 18:
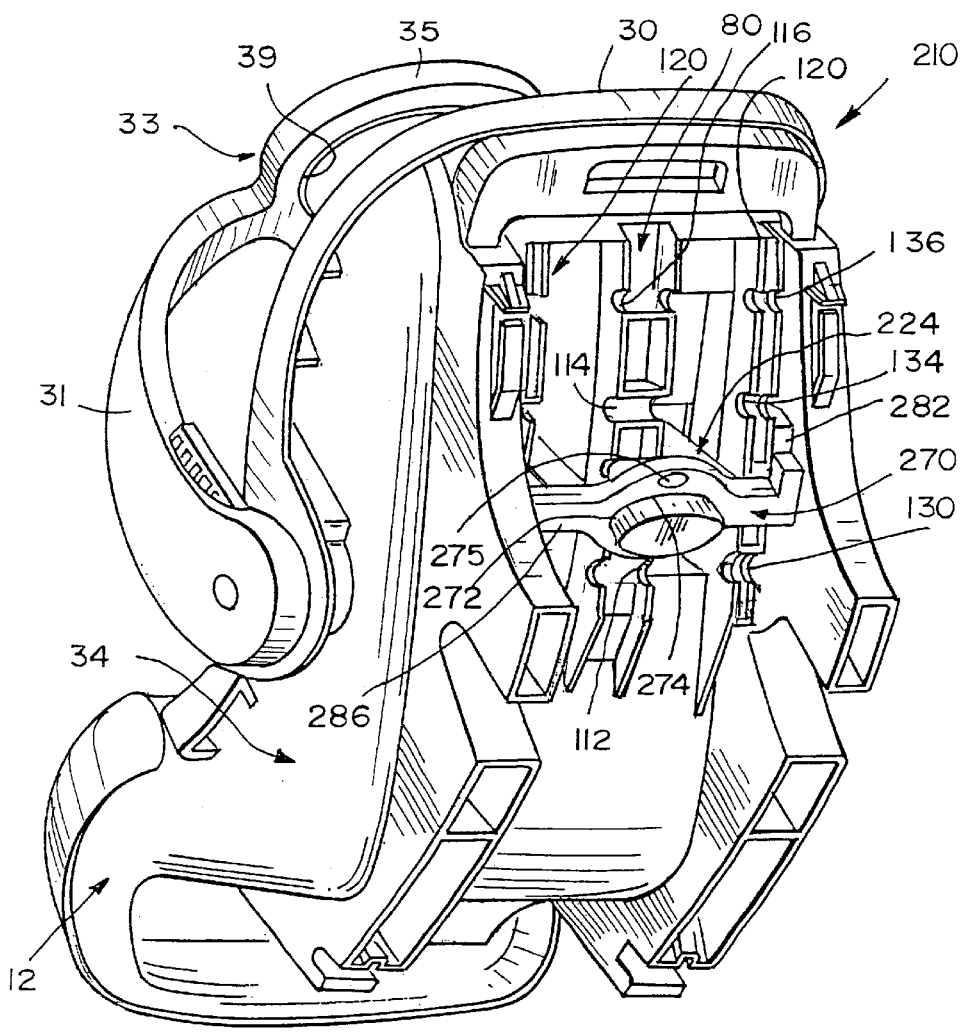
FIG. 18 is a rear perspective view of the juvenile seat carrier shown in FIGS. 1–11 including the alternative panel-height adjustment mechanism shown in FIGS. 12–17 coupled to the back side of the carrier.

Alternative panel height adjustment mechanism 224 of alternative carrier 210 can also be used with carrier 10, as shown in FIG. 18, for example. Further, it is within the scope of this disclosure to include any juvenile carrier having any of the panel height adjustment mechanisms disclosed herein. Mechanism 224 operates in the same manner, as described above, when coupled to carrier 210 as with carrier 10.

Figure 19:
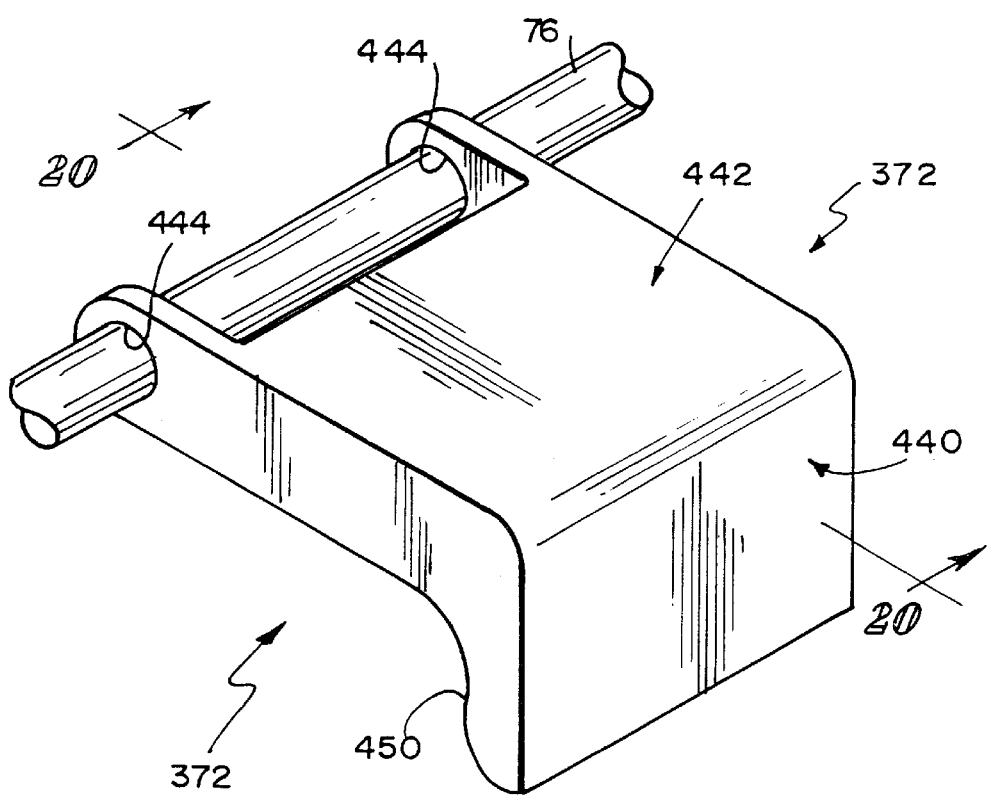
FIG. 19 is a perspective view of an alternative pull-handle coupled to the belt support bar of an alternative panel-height adjustment mechanism for use with either of the juvenile seat carriers shown in the previous figures.
Figure 20:
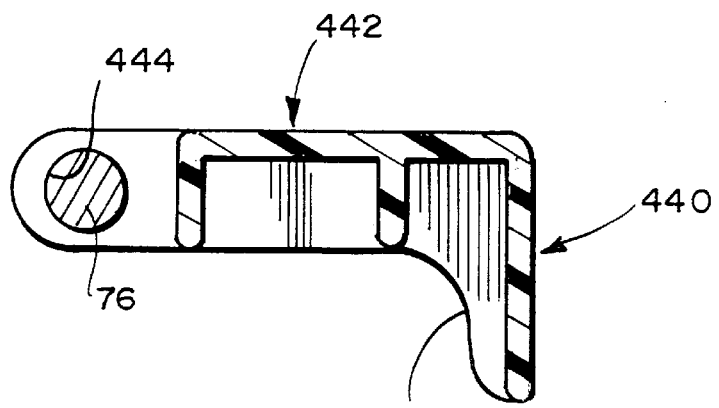
FIG. 20 is a sectional view taken along line 20—20 of FIG. 19 showing the pull-handle being "L-shaped" and including a horizontal member and a vertical member.

Yet another pull-handle 372 is shown in FIGS. 19 and 20. Pull-handle 372 may be used with either panel height adjustment mechanism 24, 224 described above. Pull-handle 372 includes a grip portion 440 and a bar-mount portion 442 coupled to grip portion 440. Belt support bar 76 is received within apertures 444 formed in bar-mount portion 442 to coupled belt support bar 76 to pull-handle 372.

Pull-handle 372 is "L-shaped" such that bar-mount portion 442 is defined by a generally horizontal member and grip portion 440 is defined by a generally vertical member coupled to bar-mount portion 442 at an end opposite that which includes apertures 444. Pull-handle 372 operates in the same manner as the other pull-handles 72, 272 described above. A user's fingers may be placed adjacent a back wall 450 of grip portion 440 so that the user is able to pull the pull-handle 372 in a direction away from the juvenile carrier 10 or 210.

Although this invention has been described in detail with reference to certain embodiments, variations and modifications exist within the scope and spirit of the invention as described and defined in the following claims.

What is claimed is:

1. A juvenile seat comprising
 a seat shell including a bottom seat portion and a back support portion, the back support portion having a front surface and a back surface,
 a juvenile-restraint harness coupled to the seat shell, the harness having a shoulder strap including two shoulder strap portions,
 a harness-control panel configured to position the shoulder strap portions of the juvenile-restraint harness, the harness-control panel being mounted on the seat shell for movement relative to the seat shell to raise and lower the shoulder strap portions with respect to the bottom seat portion, the harness-control panel being positioned adjacent the front surface of the back support portion,
 a panel height adjustment mechanism coupled to the back surface of the back support portion and configured to include a pull-handle, a belt support bar coupled to thee pull-handle, a panel height locator coupled to the seat shell, and a handle bar coupled to the belt support bar and the harness-control panel and formed to include an aperture for slidably receiving the pull-handle therethrough, the belt support bar is configured to engage and disengage the panel height locator to secure the harness-control panel at a desired height, and the pull-handle is configured to move relative to the handle bar between a lock position where the belt support bar is engaged with the panel height locator and a release position where the belt support bar is disengaged from the panel height locator, and
 at least one spring coupled to the belt support bar and wherein the belt support bar is spring-biased toward the lock position by at least one spring.

2. The seat of claim 1, wherein the belt support bar and the pull-handle are movable relative to the handle bar in order to position the pull-handle in the release position to allow the handle bar and harness-control panel to move relative to the bottom seat portion of the seat shell.

3. The seat of claim 1, wherein the pull-handle moves in a generally horizontal direction away from and toward the back surface of the back support portion of the seat shell and is normally biased in the lock position toward the back support portion of the seat shell.

4. The seat of claim 3, wherein the handle bar includes a guide channel for slidably receiving a portion of the belt support bar therethrough.

5. The seat of claim 2, wherein the pull-handle includes an aperture for receiving the belt support bar therethrough.

6. The seat of claim 4, wherein the panel height adjustment mechanism further includes a tension spring coupled at one end to a spring mount of the handle bar and at another end to the belt support bar.

7. A juvenile seat comprising
 a seat shell including a bottom seat portion and a back support portion, the back support portion having a front surface and a back surface,
 a juvenile-restraint harness including a shoulder strap having shoulder strap portions, the harness being coupled to the seat shell,
 a harness-control panel configured to position the shoulder strap portions, the harness-control panel being positioned adjacent the front surface of the back support portion and further being mounted on the seat shell for movement relative to the seat shell to raise and lower the shoulder strap portions with respect to the bottom seat portion, and
 a panel height adjustment mechanism coupled to the harness-control panel and configured to move between a lock position in order to secure the harness-control panel at a desired height with respect to the bottom portion of the seat shell and a release position in order to move the harness-control panel relative to the seat shell, the panel height adjustment mechanism includes at least one slot for receiving a shoulder strap portion, and
 means for moving the panel height adjustment mechanism from the normal lock position to the release position.

8. A juvenile seat comprising a seat shell including a bottom seat portion and a back support portion, the back support portion having a front surface and a back surface, a juvenile-restraint harness including a shoulder strap having shoulder strap portions, the harness being coupled to the seat shell, a harness-control panel configured to position the shoulder strap portions, the harness-control panel being positioned adjacent the front surface of the back support portion and further being mounted on the seat shell for movement relative to the seat shell to raise and lower the shoulder strap portions with respect to the bottom seat portion, and a panel height adjustment mechanism coupled to the harness-control panel and configured to move between a lock position in order to secure the harness-control panel at a desired height with respect to the bottom portion of the seat shell and a release position in order to move the harness-control panel relative to the seat shell, and means for moving the panel height adjustment mechanism from the normal lock position to the release position, wherein the means includes a handle bar coupled to the harness-control panel, a pull-handle movable relative to the handle bar, and a belt support bar coupled to the pull-handle and the handle bar and normally biased to the lock position toward the back support portion of the shell, and wherein the pull-handle is movable in a direction away from the harness-control panel to move the belt support bar from the lock position to the release position.

9. A juvenile seat comprising a seat shell including a bottom seat portion and a back support portion, the back support portion having a front surface and a back surface, a juvenile-restraint harness coupled to the seat shell, the harness having a shoulder strap including two shoulder strap portions, a harness-control panel configured to position the shoulder strap portions of the juvenile-restraint harness, the harness-control panel being mounted on the seat shell for movement relative to the seat shell to raise and lower the shoulder strap portions with respect to the bottom seat portion, the harness-control panel being positioned adjacent the front surface of the back support portion, and a panel height adjustment mechanism coupled to the back surface of the back support portion and configured to include a pull-handle having a grip portion and a bar-mount portion coupled to the grip portion, a belt support bar coupled to the bar-mount portion of the pull-handle, and a panel height locator coupled to the seat shell, the belt support bar provided to engage and disengage the panel height locator to secure the harness-control panel at a desired height, the pull-handle configured to move between a lock position where the belt support bar is engaged with the panel height locator and a release position where the belt support bar is disengaged from the panel height locator, and the bar-mount portion of the pull-handle being a substantially horizontal member which is fixed to the grip portion of the pull-handle being a generally vertical member.

10. A juvenile seat comprising a seat shell including a bottom seat portion and a back support portion, the back support portion having a front surface and a back surface, a juvenile-restraint harness coupled to the seat shell, the harness having a shoulder strap including two shoulder strap portions, a harness-control panel configured to position the shoulder strap portions of the juvenile-restraint harness, the harness-control panel being mounted on the seat shell for movement relative to the seat shell to raise and lower the shoulder strap portions with respect to the bottom seat portion, the harness-control panel being positioned adjacent the front surface of the back support portion, and a panel height adjustment mechanism coupled to the back surface of the back support portion and configured to include a pull-handle having a grip portion and a bar-mount portion coupled to the grip portion, a belt support bar coupled to the bar-mount portion of the pull-handle, and a panel height locator coupled to the seat shell, the belt support bar provided to engage and disengage the panel height locator to secure the harness-control panel at a desired height, the pull-handle provided to move between a lock position where the belt support bar is engaged with the panel height locator and a release position where the belt support bar is disengaged from the panel height locator, and the grip portion of the pull-handle includes a front wall, a rear wall spaced-apart from the front wall, and a middle wall coupled to and positioned between the front wall and the rear wall to cooperate with the front and rear walls to form a finger-receiving receptacle, and the adjustment mechanism including a thumb-support positioned above the pull-handle and provided for the support of a user's thumb when the pull-handle is being moved from the lock position to the release position.

* * * * *